United States Patent [19]

Myers

[11] 4,042,050
[45] Aug. 16, 1977

[54] BALANCE BEAM SCALE

[75] Inventor: Earl D. Myers, Scotch Plains, N.J.

[73] Assignee: Ohaus Scale Corporation, Florham Park, N.J.

[21] Appl. No.: 674,509

[22] Filed: Apr. 7, 1976

[51] Int. Cl.² .................. G01G 21/24; G01G 21/22
[52] U.S. Cl. .................. 177/198; 177/197; 177/253
[58] Field of Search ............... 177/190–198, 177/128, 253

[56] References Cited

U.S. PATENT DOCUMENTS

| | | | |
|---|---|---|---|
| 423,183 | 3/1890 | Schmidt | 177/198 X |
| 939,347 | 11/1909 | Strauss | 177/190 |
| 1,351,449 | 8/1920 | Stevens | 177/198 X |
| 1,473,126 | 11/1923 | Sawyer | 177/253 X |
| 1,899,436 | 2/1933 | Fletcher | 177/198 |
| 2,272,142 | 2/1942 | Weckerly | 177/198 X |
| 2,310,493 | 2/1943 | Richard | 177/198 |
| 2,503,218 | 4/1950 | Rundquist | 177/194 |
| 2,839,288 | 6/1958 | Hadley et al. | 177/198 |
| 3,502,163 | 3/1970 | Stehl | 177/191 X |

*Primary Examiner*—George H. Miller, Jr.
*Attorney, Agent, or Firm*—Alfred L. Michaelsen

[57] ABSTRACT

A balance beam type scale which is particularly adapted for educational purposes, i.e. for use by grammar school children. The components of the scale are easily assembled. Also, the scale is so constructed and arranged as to permit the weighing of a solid article, granulated materials or a liquid. Although the scale is ruggedly constructed for use by children, it includes features which have heretofore only been found in more expensive scales, for example a check lever.

17 Claims, 6 Drawing Figures

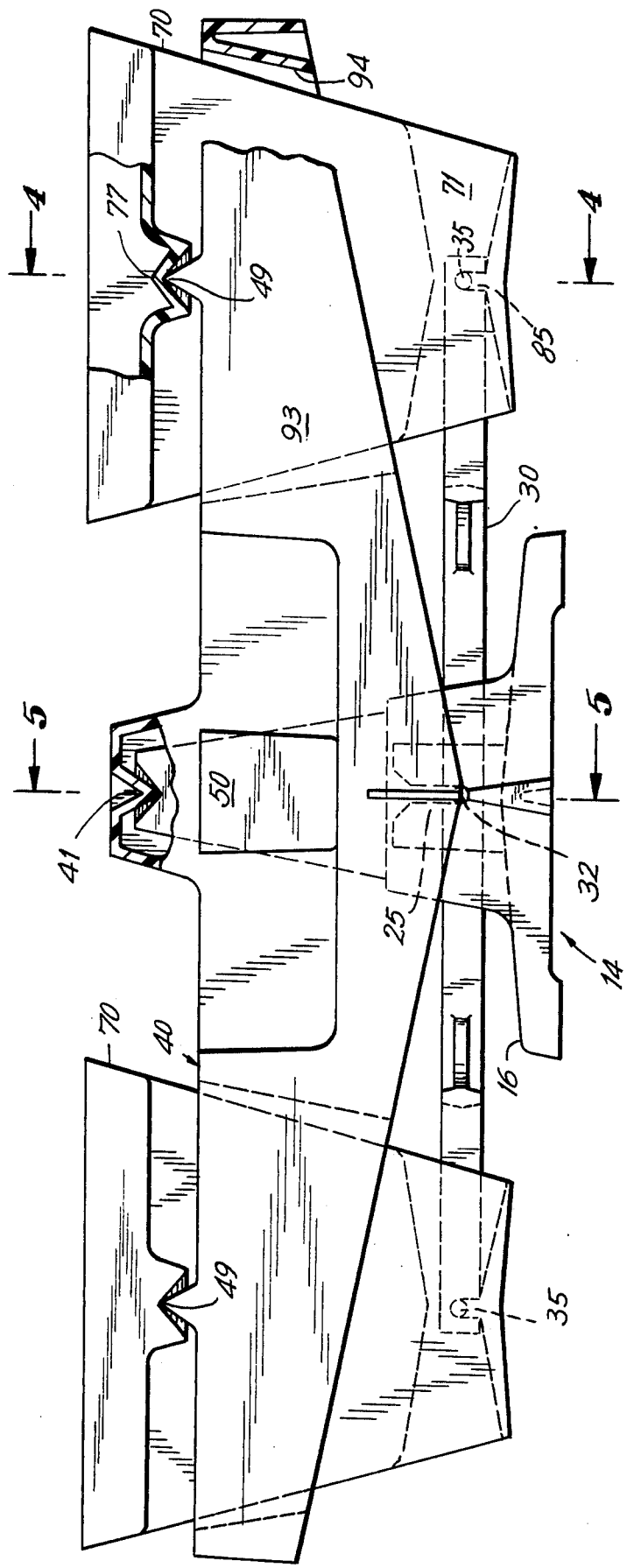

BALANCE BEAM SCALE

BACKGROUND OF THE INVENTION

1. Field To Which The Invention Pertains

In the lower grades of grammar school, children are introduced to the concepts of weight and volume. Because these concepts are somewhat abstract, educators have realized the importance of providing children with an opportunity to relate these concepts to physical objects. Thus, it is desirable to provide children with weighing devices whereby they can conduct their own experiments to determine the weight of commonly encountered articles, as well as the relative weight of articles, for example the weight of a blackboard eraser versus the weight of one or more pieces of chalk. In the same context, it is also important for children to develop an understanding of the weight of liquids and granulated material, such as sand or salt.

To satisfy all these objectives, it is desirable to provide a child with a scale of the beam balance type whereby the weight of different articles may be compared to determine which is the heavier article. Also, with a scale of this type, a standard weight may be used to ascertain the actual weight of a particular article.

Although the desirability of providing children with a reasonably accurate and sensitive beam balance type scale is clear, the problems of designing and constructing such a scale are equally clear. For example, since the scale is to be used by children, it must be of a particularly rugged and simple construction. Additionally, in order to insure that schools can afford to purchase a number of these scales, the cost of the scale must be quite low. Although it may be a simple matter to provide a primitive beam balance type scale which is both inexpensive and sturdy, it must also be realized that such a scale should be reasonably accurate and sensitive. In the absence of reasonable accuracy and sensitivity, the entire educational objective will be frustrated. Thus, ideally it is desirable to provide a child with a beam balance scale which incorporates accuracy promoting features which are generally only found in expensive scales.

In summary, it will be seen that there are conflicting design criteria associated with providing an accurate, all purpose beam balance type scale for educational use by grammar school children. A scale of this type is the field to which this invention pertains.

2. Prior Art

A number of prior art patents disclose scales of the balance beam type, e.g. U.S. Pat. Nos. 423,183, 939,347, 1,351,449, 1,899,436, 2,272,142, 2,839,288 and 3,502,163.

In the area of beam balance scales for educational use by small children, perhaps the most relevant of these patents is U.S. Pat. No. 3,502,163. Although the construction of the beam balance scale disclosed in this patent appears to be sturdy and simple, the accuracy and sensitivity of this scale may be marginal in view of the fact that this scale does not include a so-called check lever. Scales which do not include a check lever may not produce an accurate weighing since, with such scales, a balance condition may or may not be obtained, depending upon the position of the weight on the weighing tray.

SUMMARY OF THE INVENTION

A beam balance type scale preferably constructed entirely of plastic components, which are easily assemblable. The scale includes a check lever and a balance beam. A weighing bucket is pivotally mounted on each end of the balance beam and extends downwardly below the balance beam and is pivotally connected to a respective end of the check lever.

DESCRIPTION OF THE DRAWINGS

FIG. 2 is a front view of the scale shown in FIG. 1.

DESCRIPTION OF THE INVENTION

Figure 1:
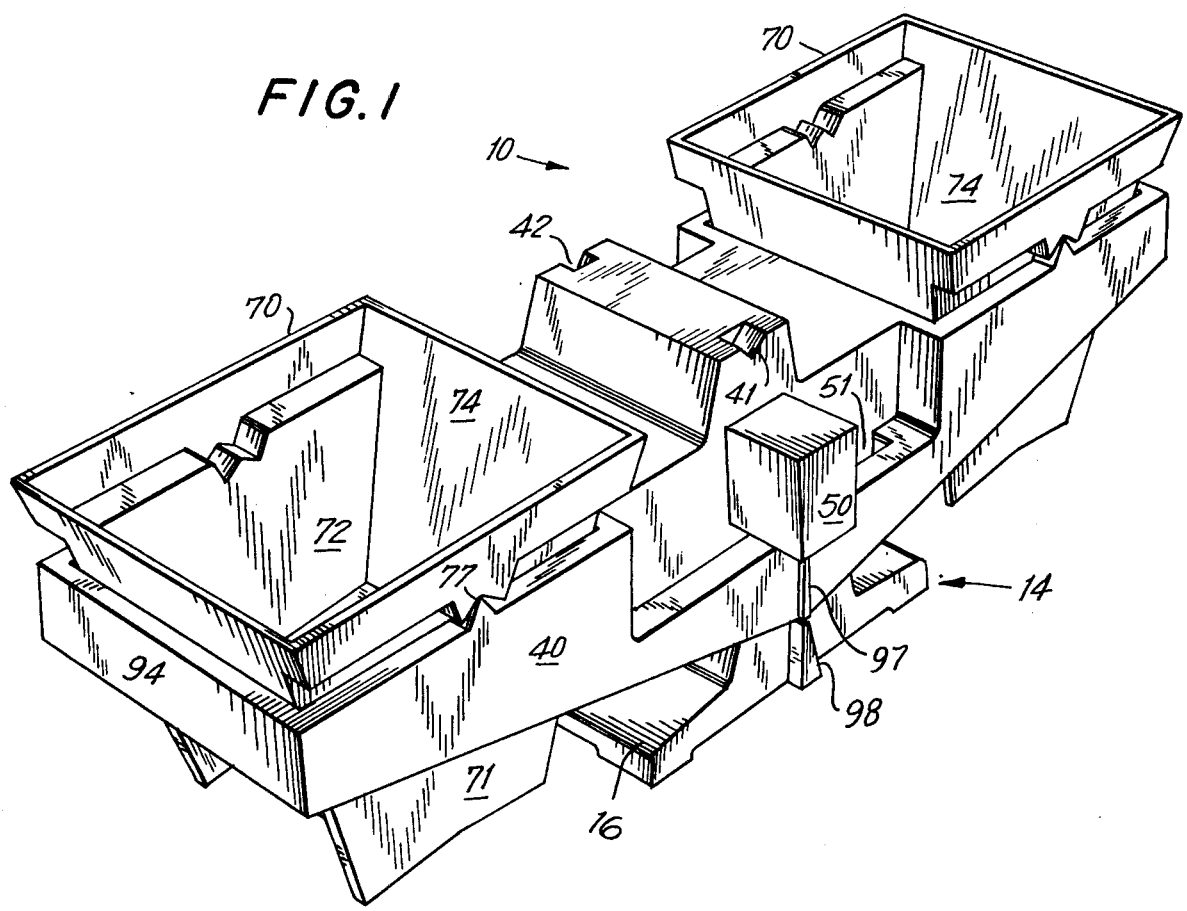
FIG. 1 is a perspective view of a preferred embodiment of my invention.
Figure 5:
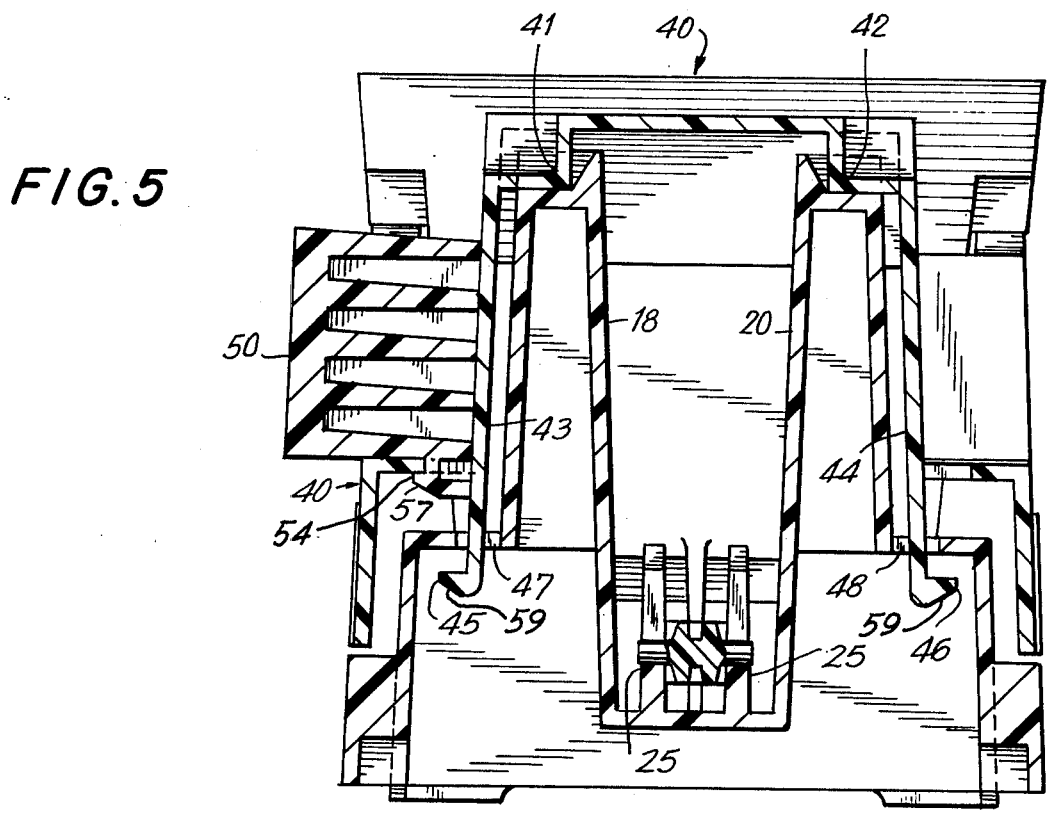
FIG. 5 is a sectional view taken along the section lines 5—5 of FIG. 2.
Figure 6:
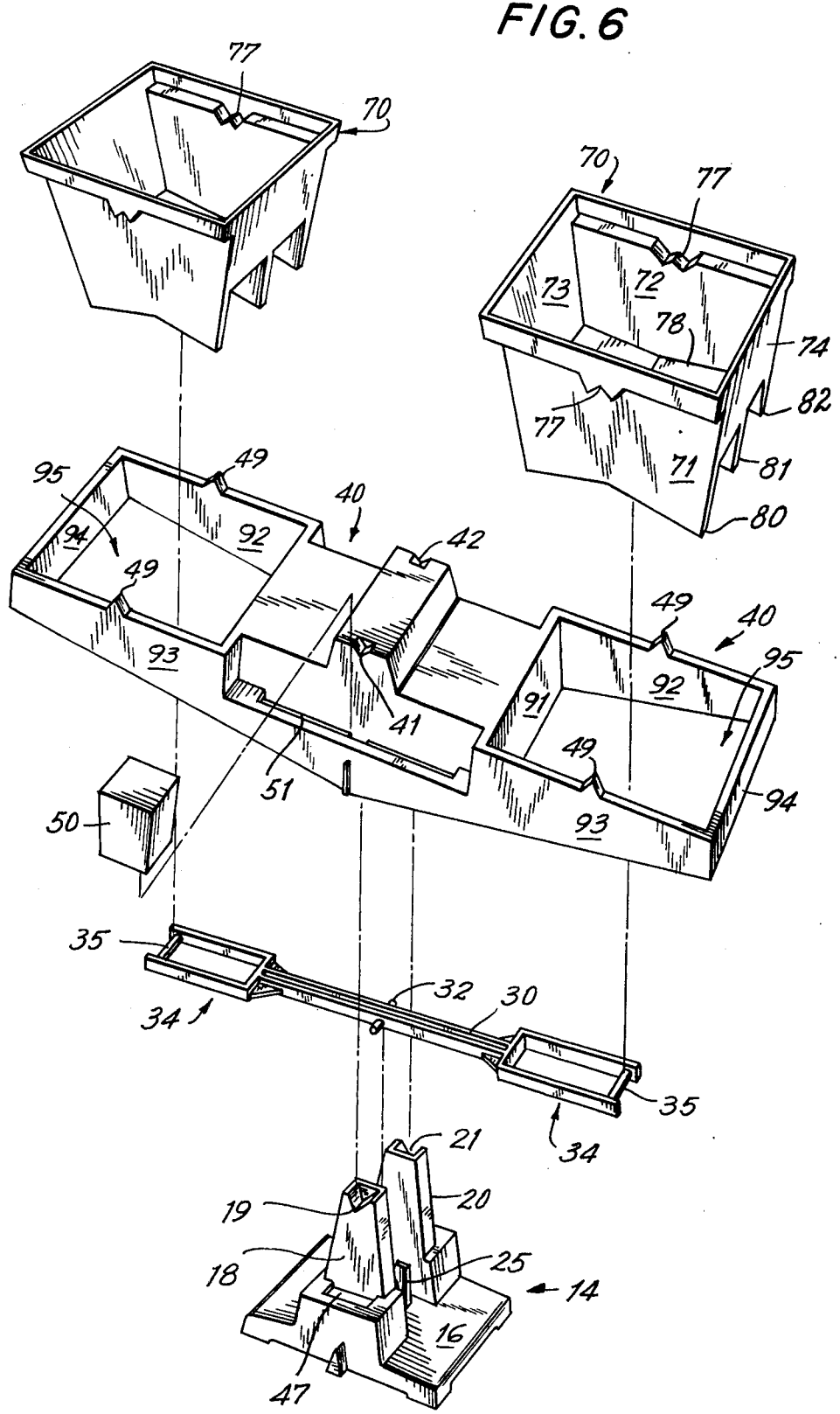
FIG. 6 is an exploded perspective view of the scale shown in FIG. 1.

The scale 10 shown in FIG. 1 represents a preferred embodiment of my invention. As shown in FIGS. 1, 2 and 6, the balance beam scale 10 includes a support member 14, which is preferably a one-piece, molded plastic construction. The support member 14 includes a base 16. Two columns 18 and 20 extend upwardly from the base 16. The upper end of each of the columns 18 and 20 is formed so as to provide knife edge bearings 19 and 21, respectively. A pivot bearing 25 is provided on the inner face of each of the columns 18 and 20. In FIG. 2, one of the pivot bearings 25 is shown in the phantom and in FIG. 6 the pivot bearing 25 associated with the column 20 is visible. In FIG. 5, the two pivot bearings 25 appear in section.

As perhaps best seen in FIG. 2, a check lever 30 is pivotally mounted in the pivot bearings 25 of the support member 14. Referring to FIG. 6, it will be seen that the check lever 30 includes a pivot pin 32. Thus, when the check lever 30 is mounted on the support member 14, the pivot pin 32 is received in the pivot bearings 25. As seen in FIG. 6, the check lever extends outwardly from the pivot pin 32 and each end of the check lever 30 terminates with a clevis 34 which includes pin 35. Thus, referring again to FIG. 2, it will be seen that the check lever 30 is pivotally mounted on the support member 14 and extends outwardly in opposite directions from the pivot pin 32. Preferably, the check lever is made of a molded thermoplastic material.

Referring to FIGS. 1 and 2, a balance beam 40 is pivotally mounted on the support member 14. At the center of the balance beam 40, there are provided two knife edge pivots 41 and 42. The knife edge pivots 41 and 42 are received in the pivot bearings 19 and 21 of the support member 14.

As best seen in FIG. 5, the center portion of the balance beam 40 includes downwardly extending members 43, 44. At the end of the downwardly extending members 43, 44, there are provided outwardly extending tabs 45, 46. Preferably, the balance beam 40 is a one-piece, molded plastic construction. By the use of a one-piece, molded plastic construction, the downwardly extending members 43, 44 may be moved inwardly, toward each other, as seen in FIG. 5. The members 43, 44 extend downwardly through apertures 47, 48 which are provided in the support member 14. Thus, it will be seen that when the balance beam 40 is mounted on the support member 14, the tabs 45, 46 of the downwardly extending members 43, 44 are pushed through the apertures 47, 48. Additionally, as may be noted from an inspection of FIG. 5, the distance between the outer ends of the tabs 45, 46 is normally greater than the distance between the apertures 47, 48. Thus, when the balance beam 40 is pushed down onto the support member 14, the downwardly extending members 43, 44 move inwardly until the tabs 45, 46 pass through the apertures 47, 48. Thereafter, the downwardly extending members 43, 44 snap outwardly into the position shown in FIG. 5. Thereby, the balance beam 40 is snap-locked onto the support member 14. In this manner, the balance beam 40 is pivotally mounted on the support member 14.

As shown in FIGS. 1, 2, 5 and 6, a poise 50 is slidably mounted on the balance beam 40. More specifically, the center portion of the balance beam 40 is provided with a slot 51. A tap member 54 is provided on the bottom of the poise 50. Thus, the tab member may be pushed through the aperture 51. Thereby, the poise 50 is snap-locked onto the balance beam 40 and slidably mounted thereon. To assist in mounting the poise 50 on the balance beam 40, the tab 54 may be provided with a camming surface 57. Similarly, the tabs 45, 46 may be provided with camming surfaces 59 to facilitate the insertion of the members 43, 44 into the apertures 47, 48.

Each end of the balance beam 40 includes walls, 91, 92, 93 and 94, which together define an enclosure or aperture 95. A knife edge 49 is formed in each of the walls 92 and 93.

Figure 3:
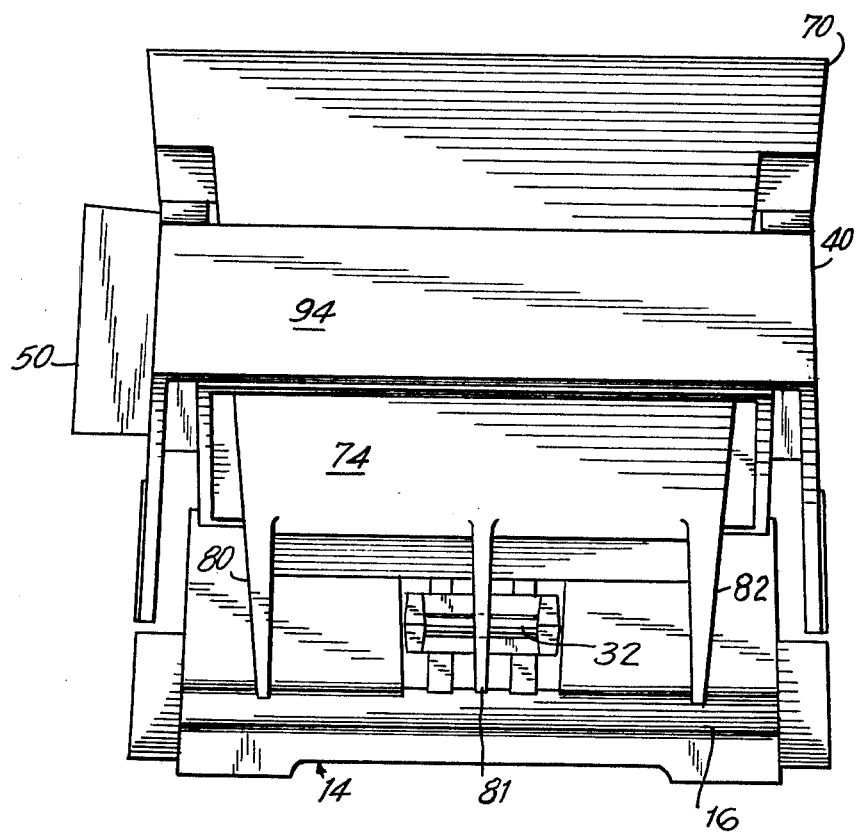
FIG. 3 is an end view of the scale shown in FIG. 1.
Figure 4:
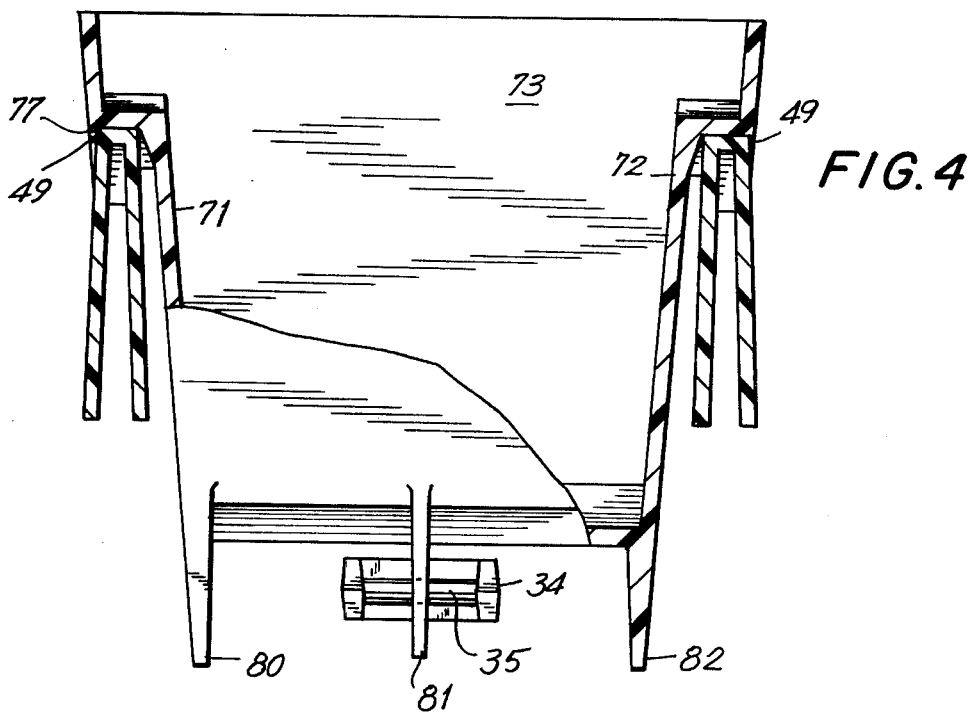
FIG. 4 is a sectional view taken along the section lines 4—4 of FIG. 2.

The balance beam scale 10 also includes a pair of buckets 70 which preferably are identically constructed. Since the buckets 70 are identically constructed and the outer portions of the balance beam 40 are identically constructed, the construction of only one bucket and the construction of only one end of the balance beam 40 will be described. Referring to FIGS. 3, 4 and 6, the walls of each of the buckets 70 are preferably tapered downwardly and inwardly, e.g. the front and back walls 71 and 72 and the side walls 73, 74 all taper downwardly and inwardly, i.e. the opposed walls are synclinally disposed. A knife edge bearing 77 is provided and is preferably integrally formed in the front wall 71 and the back wall 72. Each of the buckets 70 is provided with at least one rib and preferably three ribs 80, 81 and 82, which extend downwardly from the bottom wall 78 of the bucket and extend parallel to the check lever 30. A slot 85 is provided in the center of the middle rib 81.

Each of the buckets is removably received in a respective end of the balance beam 40. Thus, as suggested in FIG. 6 each of the buckets 70 is inserted downwardly into the enclosure or aperture 95 formed in each end of the balance beam 40. As an assistance to a child attempting to insert the bucket 70 into the apertures at the end of the balance beam, the inner walls 91-94 which define the apertures 95 are tapered generally to correspond to the tapered walls of the bucket. Thus, the enclosures or apertures in the balance beam act as a guide to properly locate the bucket within the balance beam aperture. When each of the buckets is properly located, the knife edge bearings 77 will be positioned on top of the knife edge pivot points 49. Additionally, the pin 35 at each end of the check lever 30 is positioned within the slot 85 of the rib 81.

As shown in FIGS. 1, 2 and 5, the balance beam 40 includes a raised vertical portion 97 and the support 14 includes a reference pointer 98. The raised vertical portion 97 and the reference pointer 98 together from indicia means for indicating a condition of balance.

Considering the scale 10 shown in FIG. 1 and 2, it will be appreciated that the previously described construction of the scale provides a number of significant benefits. For example, all of the parts are preferably made of molded plastic material. As a result, the construction material is low in cost. Also, since these parts are molded, the production costs are low. Still further, it should be noted that all of the component parts of the scale can be assembled without the use of any tools. As a result, the scale may be shipped in a disassembled condition and easily assembled by a teacher. Additionally, since the poise is snap-locked onto the balance beam and the balance beam is snap-locked onto the support member, these component parts will remain together until disassembled by an adult.

From the point of view of the child, the buckets are easily removable from the balance beam. Thus, a child may remove one or both buckets from the balance beam and fill it, at another location. Additionally, since the articles to be weighed are placed within buckets, rather than on a pan, granulated material or a liquid may easily be weighed.

Additionally, as those skilled in the art will apppreciate, a balance beam scale with a check lever is an inherently more reliable weighing device. In all prior art balance beam constructions of which I am aware and which include a check lever, the article or articles to be weighed are placed upon a pan, the upper surface of which is disposed above the upper surface of the balance beam. In these prior art constructions, a link is then provided to connect each end of the balance beam with each end of the check lever. In contrast to such prior art constructions, a scale constructed in accordance with my invention provides a weight receiving container which also functions as the link between the balance beam and the check lever. As a consequence of this construction, the article or articles to be weighed are disposed below the upper surface of the balance beam and the number of component parts of the scale has been reduced, since separate links are not required to connect the balance beam and the check lever.

Since only a preferred embodiment of my invention has been described, the full scope of my invention is comprehended by the appended claims.

I CLAIM:
1. A balance beam scale which comprises:
   a. a support member;
   b. a balance beam pivotally mounted on said support member;
   c. two weighing buckets, each of said buckets being pivotally mounted on a respective end of said balance beam, each of said buckets being open at the top for receiving therein an article to be weighed, the bottom of each of the said buckets being below the upper surface of said balance beam; and
   d. a check lever pivotally secured to said buckets, adjacent to the bottom of said buckets.

2. The balance beam scale of claim 1 wherein said buckets are removably mounted on said balance beam.

3. The balance beam scale of claim 2 wherein each of said buckets is mounted on said balance beam by knife edge pivot and bearing means.

4. The balance beam scale of claim 2 wherein said balance beam entirely surrounds each of said buckets.

5. The balance beam scale of claim 4 wherein the end walls of each of said buckets are synclinally disposed.

6. The balance beam of claim 5 wherein the walls of said balance beam which are adjacent to the end walls of each bucket are synclinally disposed.

7. A balance beam scale which comprises:
   a. a support member;
   b. a balance beam pivotally mounted on said support member, each end of said balance beam defining a bucket receiving enclosure and, at each end of said balance beam, a pair of upwardly facing knife pivots;
   c. indicia means mounted on said support member and said balance beam for indicating a condition of balance;
   d. a check lever pivotally mounted on said support member and extending outwardly from said support member and below said balance beam; and
   e. two buckets, each of said buckets being pivotally mounted at a respective end of said balance beam and on said pair of upwardly facing knife edge pivots, the lower portion of each of said buckets being pivotally connected to a respective end of said check lever.

8. The balance beam scale of claim 7 wherein each of said buckets is plastic and each of said buckets includes at least one rib extending downwardly from the bottom wall thereof.

9. The balance beam scale of claim 8 wherein said at least one rib includes a slot and each end of said check lever includes a pin which is received in the slot in the rib on the adjacent bucket.

10. The balance beam scale of claim 7 wherein said support member, said balance beam, said check lever and said buckets are all plastic.

11. The balance beam scale of claim 10 which further includes a poise slidably mounted on said balance beam.

12. The balance beam scale of claim 11 wherein said poise is plastic.

13. A balance beam scale which comprises:
   a. a support member;
   b. a balance beam snap-locked onto said support member for pivoting movement;
   c. two buckets, each bucket being removably mounted on a respective end of said balance beam and extending downwardly below the upper surface of said balance beam;
   d. pivot bearing means between each end of said balance beam and a respective one of said buckets whereby each of said buckets is pivotally mounted on said balance beam;
   e. a check lever pivotally mounted on said support member and extending outwardly therefrom and below said balance beam; and
   f. means pivotally connecting the bottom portion of each of said buckets with a respective end of said check lever.

14. The balance beam scale of claim 13 which further includes:
   a. a poise slidably mounted on said balance beam; and
   b. indicia means mounted on said balance beam and said support member for indicating a condition of balance.

15. The balance beam scale of claim 14 wherein said balance beam entirely surrounds each of said buckets.

16. The balance beam scale of claim 14 wherein each of said buckets is downwardly and inwardly tapered.

17. The balance beam scale of claim 16 wherein each of said buckets includes at least one rib which extends downwardly from the bottom wall of said buckets, said rib having a slot formed therein, and wherein each end of said check rod includes a pin, each of said pins being disposed in a respective one of said slots.

* * * * *